July 5, 1955     R. G. NESTER     2,712,520
SPINNING-BAND FRACTIONATING COLUMN
Filed Dec. 8, 1952     2 Sheets-Sheet 1
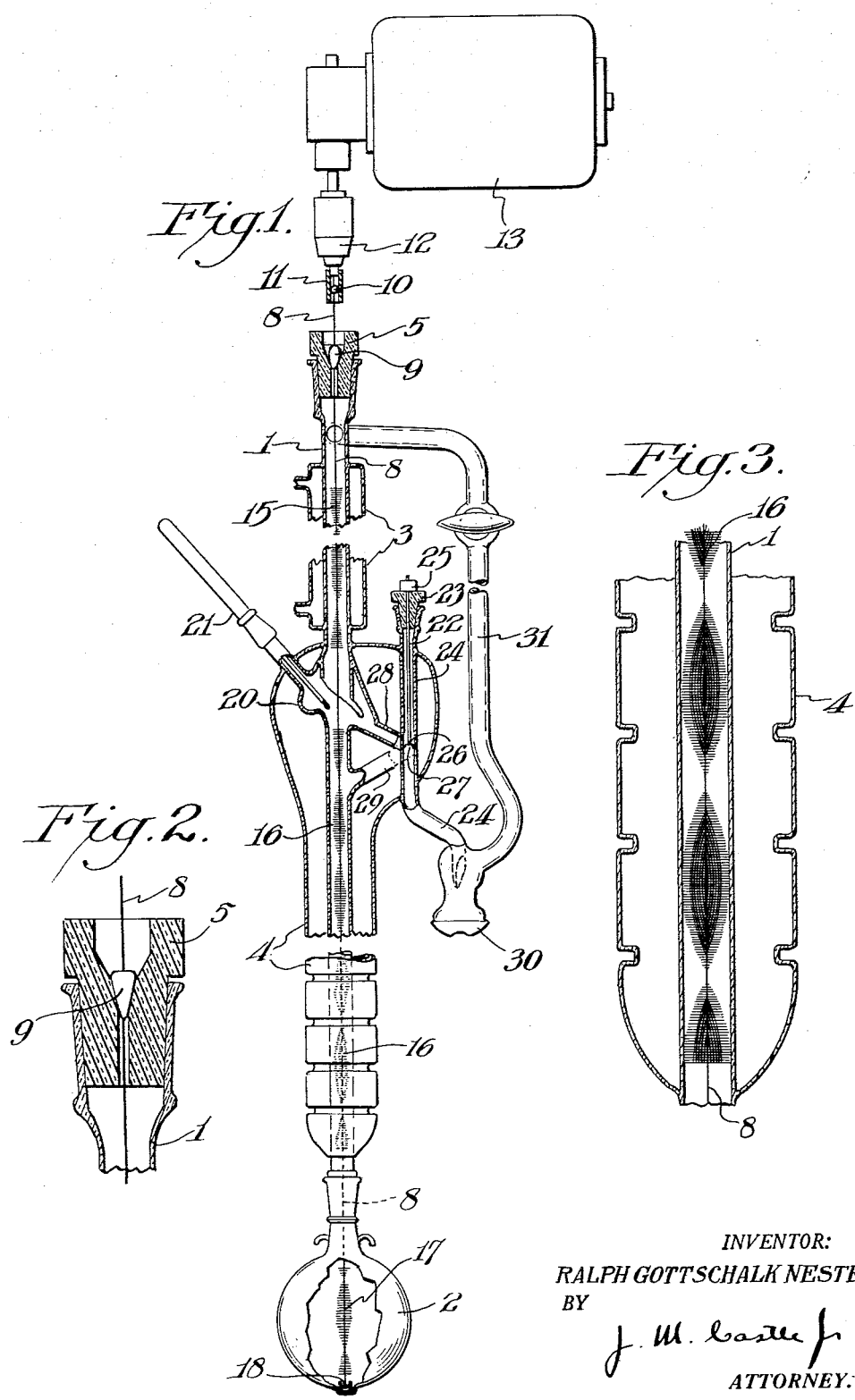
INVENTOR:
RALPH GOTTSCHALK NESTER
BY
J. M. Castle Jr.
ATTORNEY.

July 5, 1955  R. G. NESTER  2,712,520
SPINNING-BAND FRACTIONATING COLUMN
Filed Dec. 8, 1952  2 Sheets-Sheet 2

INVENTOR
RALPH GOTTSCHALK NESTER

BY
ATTORNEY 2,712,520

SPINNING-BAND FRACTIONATING COLUMN

Ralph Gottschalk Nester, Wilmington, Del., assignor to E. I. du Pont de Nemours and Company, Wilmington, Del., a corporation of Delaware Application December 8, 1952, Serial No. 324,753

10 Claims. (Cl. 202—153)

This invention relates to a gas-liquid contacting apparatus and, more particularly, to such apparatus adapted for use as a fractionating column or scrubbing tower.

The separation of liquids having different boiling points by fractional distillation and the purification of gases by washing or scrubbing with liquids are important processes in the chemical industry. Consequently, many types of fractionating columns and scrubbing towers have been proposed in order to provide more efficient operations of this type. For example, the efficiency of fractional distillation has been improved by the use of fractionating columns packed with various types of fillers such as ceramic saddles, single turn metal or glass helices, metal gauze or screen formed into cones, truncated conical discs, and other shapes, and continuous metal gauze spirals fitting tightly between the walls of the column. The operating characteristics of columns packed with these different types of fillers vary with the type of packing. Some provide a high degree of fractionation but permit only small amounts of material to be put through the still, or have such a high holdup that they cannot be used for fractionation of small quantities. Some require very long columns to obtain the desired degree of fractionation. Others provide efficient fractionation at atmospheric pressure but are not satisfactory at reduced pressure. Still others operate effectively when properly packed but are inefficient when improperly packed or when the packing becomes disarranged.

In addition to the fractionating columns having stationary packings, a number of distilling columns having spinning center parts have been proposed. These spinning types have been proposed for the purpose of obtaining better dispersion of the liquid and gas through each other in the column. For example, columns having spinning bands, rotating cones, and rotating tubes have been designed. These rotating columns have been found to provide good dispersion of the liquid and gas through each other and they have high efficiency, low holdup, low HETP value (height equivalent theoretical plate), and low pressure drop as compared to conventional packed columns. However, since these columns are mechanical in nature, they are subject to the disadvantages associated with moving mechanical parts. For example, when such columns are operated at low pressures it is exceedingly difficult to maintain sufficiently tight seals by ordinary packings or bearings around the rotating part to maintain the low pressure necessary for the distillation of certain materials.

An object of the present invention is to provide an improved gas-liquid contacting apparatus. A further object is to provide an improved fractionating column of the spinning type. A particular object is to provide such a column wherein exceptional dispersion of gas and liquid is effected, the holdup of material being fractionated is extremely low, the over-all efficiency is high, the tendency for flooding is very low, and wherein low pressures may be maintained without difficulty. Other objects will be apparent from the description of the invention given hereinafter.

The above objects are accomplished according to the present invention by providing a gas-liquid contacting apparatus comprising a vertically disposed column of substantially circular cross-section, a vertically disposed, rotatable metal shaft extending into and for an appreciable part of the length of the column, a metal strip in the form of a helix carried by the shaft with the shaft forming the longitudinal axis of the helix and the strip extending along a substantial proportion of the shaft in the column, the strip having a plurality of openings amounting to 30%–50% of the total area of the major surface of the strip, at least one edge of the strip extending to the inner wall of the column whereby the shaft is maintained centered with respect to the column, and means for rotating the shaft.

In the preferred form of the invention, a plug is inserted in the upper end of the vertically disposed column, the plug being provided with a passage therethrough, the passage being relatively wide at the top and narrowing to form a bearing seat, and a bead is fixedly mounted on the rotatable metal shaft toward its upper end. The shaft is passed through the plug into the column until the bead rests on the bearing seat in the plug, thereby forming a rotatable seal and supporting the shaft. The plug is preferably made of a self-lubricating plastic, e. g., nylon, polytetrafluoroethylene, or the like, and the bead usually will be glass or metal. The bead is shaped to fit closely in the bearing seat formed by the narrowing passage through the plug. Usually, the bearing seat will be shaped to receive an inverted cone-shaped or hemispherical bead although it will be apparent that modifications of such shapes are entirely adapted for the purpose.

A still more preferred form of the invention is a fractional distillation apparatus comprising the usual vertically disposed column and a still pot connected to the bottom of the column and centered with respect to the column, a self-lubricating plastic plug in the upper end of the column provided with a passage therethrough which is relatively wide at the top of the plug, narrows to form an inverted conical or hemispherical bearing seat, and continues as a narrow passage to the bottom of the plug, a vertically disposed, rotatable tungsten wire shaft passing through the plug and extending throughout the length of the column to adjacent the bottom of the still pot, an inverted conical or spherical bead mounted on the shaft near its upper end and seated in the bearing seat to form a rotary seal and support the shaft, at least one wire gauze strip in the form of a diametral helix carried by the shaft and extending along a substantial proportion of the shaft in the column, the strip having a plurality of transverse wire strands extending beyond the outer longitudinal strands and contacting the inner wall of the column at each end of the strands whereby the shaft is maintained centered with respect to the column, means attached to the lower part of the shaft in the still pot to provide agitation of the liquid being distilled such as another strip of wire gauze or perforated metal in the form of a helix extending along a substantial proportion of the shaft in the still pot or a plastic or metal paddle attached to the shaft, means mounted on the bottom of the still pot for maintaining the lower end of the shaft centered, and means for rotating the shaft operatively connected to the shaft at a point above the bead.

The invention will be described in detail with reference to the accompanying drawing wherein:

Fig. 1 is a vertical elevation, largely in section, of a fractional distillation apparatus according to a preferred embodiment of the present invention;

Fig. 2 is an enlarged vertical section of the rotary seal assembly shown in Fig. 1;

Fig. 3 is an enlarged vertical section of the lower part of the fractionating section of the column shown in Fig. 1.

Figure 4:
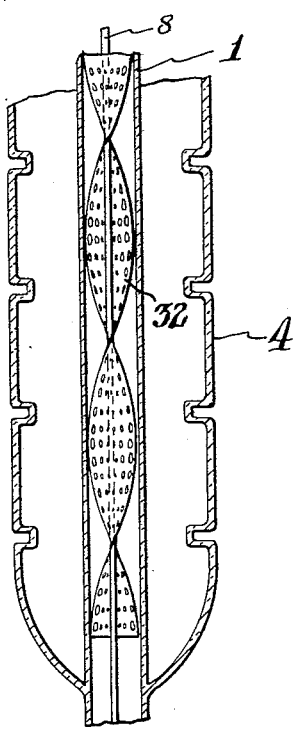
Fig. 4 is an enlarged vertical section of another type of rotatable spiral packing in which the spiral is a perforated metal plate.

Referring more particularly to Fig. 1, reference numeral 1 designates a distillation column of glass, non-corrosive metal, or the like which is connected to the still pot 2. The column 1 is provided with a water jacket 3 surrounding the condenser section at the upper end of the column 1 and a jacket 4 surrounding the fractionating section, i. e., the fractionating column proper. The space enclosed by the jacket 4 may be evacuated to minimize heat loss or, optionally, it may contain a heating unit, i. e., coils of resistance wire electrically heated. This jacket 4 is advantageously designed as shown in Fig. 3 to permit a bellows action in contracting and expanding under temperature changes.

The upper end of column 1 is tightly closed with a plug 5 made of a self-lubricating plastic which, as shown in detail in Fig. 2, is provided with a passage therethrough. This passage is relatively wide at the top of the plug, narrows down to form an inverted conical or hemisperical bearing seat, and continues as a narrow passage to the bottom of the plug 5. Any self-lubricating plastic is suitable for use in the rotary seals for the columns of this invention. Thus, polytetrafluoroethylene, polyhexamethyleneadipamide, polymonochlorotrifluoroethane, and polymers of ethylene are well suited for use as rotary seals. Rotary seals made of nylon such as polyhexamethyleneadipamide have exceptional durability. Rotary seals made of polytetrafluoroethylene have exceptional chemical resistance in combination with excellent durability. These two types of plastic are therefore preferred for use in making the rotary seals.

This apparatus is provided with a rotating element comprising a shaft 8 which is a continuous length of stainless steel, tungsten, or other corrosion-resistant metal wire or relatively flexible rod on which is mounted a glass or metal spherical or inverted conical bead 9 adapted to sit in the bearing seat of the plug 5. This bead 9 supports the weight of the suspended shaft 8 and in cooperation with the bearing seat in the plug 5 forms a peculiarly effective rotary seal. Actually, the bead 9 and bearing seat form a combination seal and suspension bearing for the rotating shaft 8 and, as a result, this assembly automatically adjusts itself to compensate for slight wear or misalignment whereas a conventional packing gland requires frequent adjustment of the packing nut to maintain leak-proof conditions.

At the upper end of the shaft 8 is mounted a second glass or metal bead 10 which is firmly held in the flexible tubing 11 attached to the chuck 12 of the variable speed electric motor 13, thus providing means for rotating the shaft 8. A motor having an output speed of at least 1000 R. P. M. is preferably used.

The shaft 8 carries one or more perforated metal or wire gauze strips, each spirally twisted into the form of a helix, with the shaft 8 forming the longitudinal axis of each helix, and this forms an important feature of the invention. As illustrated in Fig. 1, there is a strip of wire gauze 15 extending along the shaft 8 for substantially the length of the condenser section of the column 1, a second strip of wire gauze 16 extending along the shaft 8 for substantially the length of the fractionating section of column 1, and a third strip of wire gauze 17 extending along the shaft 8 for a substantial proportion of the height of the still pot 2. The strip of wire gauze 16 which extends substantially throughout the length of the fractionating section of column 1 is of the utmost importance in this invention, while the strip of wire gauze 17 in the still pot 2 is also important in contributing to the smooth functioning of the apparatus. The strip of wire gauze 15 in the condenser section of column 1 is advantageous although it may be dispensed with by increasing the length of the condenser section of column 1.

The construction and mounting of wire gauze strips 15 and 16 can be identical and is illustrated in detail in Fig. 3 with respect to wire gauze strip 16. As illustrated in Fig. 3, the wire gauze strip 16 is spirally twisted into the form of a diametral helix, in the manner of a twisted ribbon, and is attached to the shaft 8 by soldering or other means in such manner that the shaft 8 coincides with the longitudinal axis of the helix. This is the preferred type of helix for use in the apparatus of this invention. Each individual transverse strand of wire in the wire gauze strip 16 extends equally on opposite sides of the longitudinal axis of the helix, i. e., the shaft 8. The outer two to four longitudinal strands of wire in the wire gauze strip 16 are removed so that the transverse wire strands extend laterally beyond the outer longitudinal wire strands and each end of the transverse strands contacts the inner wall of the column 1. This specific construction is highly important for most efficient operation because the contact of the transverse wire strands with the inner wall of the column 1 not only keeps the shaft 8 centered with respect to column 1 but at the same time produces a high degree of turbulence in any liquid flowing down the wall of column 1 and assists in contacting vapors and liquid.

Instead of using the wire gauze strip 16 in the form of a diametral helix, the strip may be used in the form of a radial helix with the shaft 8 coinciding with the longitudinal axis of the helix. This type of helix is exemplified by the ordinary spiral staircase and, in this construction, each individual transverse strand of wire in the wire gauze strip extends only from one side of the longitudinal axis of the helix and, hence, only one end of the transverse strands contacts the inner wall of the column 1. The contact of the outer end of each transverse strand of wire in the metal gauze strip with the inner wall of the column in this construction serves the same purpose as when the diametral helix is used but there will be only half as many contacts per unit length of the wire gauze strip. In some instances, especially in large scale apparatus, the use of a radial helix may be preferred due to easier construction despite some loss in efficiency.

While the use of wire gauze for the rotating spiral packing of this invention is preferred and is illustrated by Figures 1 and 3, the rotating packing can also be a perforated metal strip twisted into the form of a helix, the perforations in the metal strip amounting to from 30% to 50% of the surface area of the strip. This type of packing is particularly well suited for use in columns of larger diameter. Both edges of the perforated metal strip, where it is formed into a diametral helix, or the outside edge where it is formed into a radial helix, should approach as closely as possible to the inner wall of the column. The edge or edges approaching the inner wall of the column can be either smooth or serrated. Ordinarily, continuous contact of the edge or edges of this type of metal strip with the inner wall of the column is impossible and it is sufficient if they extend substantially to the inner wall even though obviously not making contact therewith throughout the length of the strip. The perforations in the spiral metal strip can all be of the same size or the perforations adjacent the inner wall of the column can be larger than those remote therefrom. This latter type of construction is particularly well suited for use in columns of the larger diameters. Fig. 4 is a section similar to that shown in Fig. 3 except that the diametral helix 32 is made from a perforated metal strip. In another modification, the helix can have a solid or perforated metal strip in the center with wire gauze attached to the edge or edges of the strip adjacent the wall of the column, and with transverse wires of the gauze contacting the wall of the column.

The construction and mounting of the wire gauze strip 17 on shaft 8 (Fig. 1) is similar to that of wire gauze strips 15 and 16 although there is no necessity for removing any of the outer longitudinal strands of wire from strip 17 as, obviously, the transverse wire strands will not contact the wall of the still pot 2. The strip 17 provides the requisite agitation in the material being distilled to produce smooth boiling with uniform boiling rates and to prevent superheating of the material and "bumping" in the still pot. The strip of wire gauze 17 can be replaced with other means for agitating the contents of the still pot. Thus, a flat semicircular paddle-type stirrer attached near the lower end of the shaft 8 in the still pot provides good agitation. This construction permits the elimination of "boiling chips" or of bubble tubes in low pressure distillations. A guide bearing 18 is provided in the bottom of the still pot 2 and shaft 8 is fitted into this but does not extend to the bottom thereof since the shaft 8 must be suspended from the previously described rotary seal and suspension bearing. The bearing 18 prevents vibration or whipping of the shaft 8 in the still pot 2.

A well 20 is provided at the top of the fractionating section of column 1 to receive the thermometer 21 for measuring the temperature of the vapor at that point. A thermocouple may be used in place of the thermometer 21. Reflux ratio for this still is accurately controlled by means of an adjustable needle valve consisting of a stainless steel rod 22 which is threaded to pass through an inert plastic, e. g., polytetrafluoroethylene, plug 23 fitted in a vertical tube 24, adjustment of the valve being made by the brass turn nut 25 mounted on the rod 22. The lower end of the rod 22 is equipped with a polytetrafluoroethylene or other inert plastic tip 26 fitting into the valve seat 27 located between the arms 28 and 29 connecting with the column 1 and tube 24. The tube 24 leads to the ground joint 30 adapted to be attached to any suitable receiver for the distillate. Also, the arm 31 connecting with the column 1 at the top of the condenser section leads to the ground joint 30. A stopcock 32 is provided in the arm 31. It will be apparent that the proportion of distillate removed from the tube 24 and that returned to column 1 through the arm 29 will be regulated by adjustment of the needle valve.

In operation of this apparatus, the direction of rotation of motor 13 is such that the thrust of the rotating spiral wire gauze strips 15 and 16 is downward, thereby assisting the liquid descending the wall of column 1 in its downward path. At the same time, the rotating ends of the transverse wire strands of the gauze strips tend to break up the liquid on the wall of column 1 and provide intimate contact between the ascending vapor and the descending liquid.

The speed of rotation of shaft 8 may be varied widely but generally will be in the range of 10 to 4000 R. P. M.; the efficiency of the column is proportional to the speed of rotation up to about 2000 R. P. M. and, for more efficient fractionation, a speed of 1000 to 2000 R. P. M. is preferred. However, the column can be operated at 4000 R. P. M. and even higher speeds of rotation of the rotating unit if desired even though the through-put will be reduced. Under certain circumstances, it is quite advantageous to use these higher speeds of rotation despite the reduction in through-put.

The spiral wire gauze metal strips of the rotating packing of this invention will usually have 10 to 200 meshes per inch. Wire gauze of 80 to 100 mesh is preferred. When perforated metal strips are employed, the openings in the strip are of approximately the same total area as the openings in wire gauze, i. e., from about 30% to about 50% of the total surface area of the strips. The metal of which the strip is made can be stainless steel or other corrosion-resistant metal. The metal strip is wound in a helix preferably having from one-quarter to two turns per inch, especially good results being obtained with spirals having one-half turn per inch.

The length of the fractionating column of this invention can be varied over wide limits and is dependent on the efficiency of fractionation desired. The spiral wire gauze type of packing has an HETP value of 0.75 in. Consequently, highly efficient columns are obtained with short or only moderately long columns.

The rotating spiral metal strips and the rotary seal of this invention have been illustrated with particular reference to their use in a fractionating column. However, they are equally as efficient in other gas-liquid contacting devices. For example, they are useful in gas scrubbing towers where the gas to be purified is led into the bottom of a tower having the rotating spiral packing and the liquid treating material is introduced near the top of the column, and the purified gas leaves the column near the top. The shaft supporting the rotating spiral packing passes through the self-lubricating plastic rotary seal of this invention at the top of the tower and the bottom of the shaft fits in a guide or bearing on the inside of the bottom of the tower.

Distillation tests of various materials of different properties in fractionating columns fitted with the rotary plastic seal and the rotating spiral packing of this invention have shown outstanding operating characteristics for such columns. Fractionating columns of this type are especially suitable for distilling high boiling, high viscosity materials at low pressures. Materials of this type which cannot be distilled in hitherto known types of distilling columns can be fractionated smoothly, rapidly, and efficiently.

A fractionating column constructed according to this invention has many advantages. Among these are the following:

(1) It has high plate efficiency when the rotating shaft is operated at high speed, e. g., at 1000–1500 R. P. M. even at low operating pressures. Such high efficiency permits the use of relatively short columns;

(2) There is extremely low back pressure through the column. This reduces the superheating of the material in the still pot;

(3) The column has a high through-put. This feature makes the column valuable for large scale operations;

(4) The column has an extremely low tendency for flooding; even when the column is deliberately flooded it immediately clears itself and returns to equilibrium conditions because of the downward thrust of the rotating spiral strips. This is an important and unique characteristic because it permits handling of high boiling, high viscosity materials even under very low pressure, and at the same time permits high boil-up rate in comparison with conventional packed columns of the same diameter;

(5) The rotating spiral packing has an extremely low liquid holdup, thus making it possible to use the same column for the fractionation of small or large quantities of materials. Samples as small as 2 cc. can be distilled through a column ½" in diameter and 40" long. The same column can be used to distill 1000 cc. of material. As further illustration of the low holdup of columns of this invention, 14.7 cc. of material can be recovered from the distillation of 15.0 cc. in a column of the size just described;

(6) The self-lubricating plastic rotary seal permits the spiral metal packing to be rotated at high speed with a minimum of friction and also permits operation at low pressures without leaks at the rotary seal. Because the seal of this invention is a combination seal and suspension bearing for the rotating spiral metal strips it adjusts itself to compensate for slight wear or misalignment; whereas the conventional packing gland requires frequent adjustment of the packing nut to maintain leakproof conditions. In a conventional packing gland any misalignment or whipping of the rotating shaft produces very undesirable results, whereas with the self-lubricating plastic seal of this invention such factors have little or no effect;

(7) The simple design of the rotating unit and seal makes possible a low fabrication cost for the column;

(8) The fractionating efficiency of the column can be varied at will by varying the speed of rotation of the spiral metal packing. Maximum efficiency is obtained with high-speed rotation. However, in some cases it is desirable to distill a material with only a low degree of fractionation, and this can be done in the instant column by simply decreasing the speed of rotation of the rotating unit. Thus, one fractionating column is sufficient to provide a wide variety of degrees of fractionation desired in different distillations;

(9) The design of the rotating unit and the combined seal and suspension bearing therefor is applicable to fractionating columns having wide ranges of column sizes and capacities;

(10) High viscosity materials can be distilled and fractionated smoothly and efficiently;

(11) Continuous agitation of the material in the still pot by the rotating spiral metal strip or by the paddles attached near the bottom of the rotating shaft therein prevents superheating and the accompanying "bumping" due to irregular boiling rates;

(12) In vacuum distillation the spiral metal strip type of agitator in the still pot eliminates the need for capillary bubbling tubes to obtain smooth, uniform boiling; therefore lower pressures can be used;

(13) The rotatable spiral metal packing is easily installed in columns of desired size and is also easily removed for cleaning.

The outstanding nature of the gas-liquid contacting apparatus of this invention is clearly evident from consideration of the above advantages possessed by a fractionating column constructed in accordance with the invention. Certain of these advantages, such as low pressure drop, may be a characteristic of some of the hitherto known fractionating columns, but the prior art does not disclose any single column possessing all the advantages possessed by the columns of this invention.

This application is a continuation-in-part of applicant's copending application Ser. No. 245,057, filed September 4, 1951.

As many apparently widely different embodiments of this invention may be made without departing from the spirit and scope thereof, it is to be understood that the invention is not limited to the specific embodiments thereof except as defined in the appended claims.

The invention claimed is:

1. A gas-liquid contacting apparatus comprising a vertically disposed column of substantially circular cross-section, a vertically disposed, rotatable metal shaft extending into and for an appreciable part of the length of said column, a metal strip twisted ¼ to 2 turns per inch into the form of a helix and attached to said shaft with said shaft forming the longitudinal axis of said helix and said strip extending along a substantial proportion of said shaft in said column, said strip having a plurality of openings in its major surface amounting to 30%–50% of the total area of said strip, at least one edge of said strip extending substantially continuously throughout its length to the inner wall of said column in position to produce a high degree of turbulence in liquid flowing down said wall and to keep said shaft centered with respect to said column, and means for rotating said shaft at speeds up to at least 1,000 R. P. M. and so that the thrust of said rotating helix is downward.

2. A gas-liquid contacting apparatus as set forth in claim 1 wherein said metal strip is a wire gauze strip of 10 to 200 meshes per inch having a plurality of transverse wire strands extending beyond the outer longitudinal wire strands thereof and contacting the inner wall of said column whereby said shaft is maintained centered with respect to said column.

3. A gas-liquid contacting apparatus as set forth in claim 1 wherein said metal strip is a wire gauze strip of 80 to 100 meshes per inch and of a width substantially equal to the internal diameter of said column in the form of a diametral helix with said shaft forming the longitudinal axis of said helix, said wire gauze strip having a plurality of transverse wire strands extending beyond the outer longitudinal wire strands thereof and contacting the inner wall of said column at each end of said transverse strands whereby said shaft is maintained centered with respect to said column.

4. A gas-liquid contacting apparatus comprising a vertically disposed column of substantially circular cross-section, a plug made of a self-lubricating plastic in the upper end thereof, said plug being provided with a passage therethrough, said passage being relatively wide at the top of said plug and narrowing to form a bearing seat, a vertically disposed, rotatable metal shaft passing through said plug and extending into and for an appreciable part of the length of said column, a bead fixedly mounted on said shaft adjacent its upper end and seated in said bearing seat to form a rotary seal and to support said shaft, a metal strip twisted ¼ to 2 turns per inch into the form of a helix and attached to said shaft with said shaft forming the longitudinal axis of said helix and said strip extending along a substantial proportion of said shaft in said column, said strip having a plurality of openings in its major surface amounting to 30%–50% of the total area of said strip, at least one edge of said strip extending substantially continuously throughout its length to the inner wall of said column in position to produce a high degree of turbulence in liquid flowing down said wall and to keep said shaft centered with respect to said column, and means for rotating said shaft at speeds up to at least 1,000 R. P. M. and so that the thrust of said rotating helix is downward.

5. A gas-liquid contacting apparatus as set forth in claim 4 wherein said plug is made of nylon.

6. A gas-liquid contacting apparatus as set forth in claim 4 wherein said plug is made of polytetrafluoroethylene.

7. A gas-liquid contacting apparatus as set forth in claim 4 wherein said metal strip is a wire gauze strip of 10 to 200 meshes per inch having a plurality of transverse wire strands extending beyond the outer longitudinal wire strands thereof and contacting the inner wall of said column whereby said shaft is maintained centered with respect to said column.

8. A gas-liquid contacting apparatus as set forth in claim 4 wherein said metal strip is a wire gauze strip of 80 to 100 meshes per inch and of a width substantially equal to the internal diameter of said column in the form of a diametral helix with said shaft forming the longitudinal axis of said helix, said wire gauze strip having a plurality of transverse wire strands extending beyond the outer longitudinal wire strands thereof and contacting the inner wall of said column at each end of said transverse strands whereby said shaft is maintained centered with respect to said column.

9. A fractional distillation apparatus comprising a vertically disposed column of substantially circular cross-section, a still pot connected to the bottom of said column and centered with respect to said column, a plug made of a self-lubricating plastic in the upper end of said column, said plug being provided with a passage therethrough, said passage being relatively wide at the top of said plug and narrowing to form a bearing seat, a vertically disposed, rotatable metal shaft passing through said plug and extending throughout the length of said column to adjacent the bottom of said still pot, a bead fixedly mounted on said shaft adjacent its upper end and seated in said bearing seat to form a rotary seal and to support said shaft, a metal strip in the form of a helix carried by said shaft with said shaft forming the longitudinal axis of said helix and said strip extending along a substantial proportion of said shaft in said column, said strip having a plurality of openings in its major surface amounting to 30%–50% of the total area of said strip, at least one edge of said strip extending substantially continuously throughout its length to the inner wall of said column whereby said shaft is maintained centered with respect to said column, projecting means carried by said shaft and extending along a substantial proportion of said shaft in said still pot, means mounted on the bottom of said still pot for maintaining the lower end of said shaft centered, and means for rotating said shaft operatively connected to said shaft at a point above said bead.

10. A fractional distillation apparatus comprising a vertically disposed column of substantially circular cross-section having a condenser section and a fractionating section, a still pot connected to the bottom of said column and centered with respect to said column, a plug made of a self-lubricating plastic in the upper end of said column, said plug being provided with a passage therethrough, said passage being relatively wide at the top of said plug and narrowing to form a bearing seat, a vertically disposed, rotatable metal shaft passing through said plug and extending throughout the length of said column to adjacent the bottom of said still pot, a bead fixedly mounted on said shaft adjacent its upper end and seated in said bearing seat to form a rotary seal and to support said shaft, a wire gauze strip in the form of a helix carried by said shaft with said shaft forming the longitudinal axis of said helix and said strip extending throughout substantially the entire portion of said shaft in the condenser section of said column, a second wire gauze strip in the form of a helix carried by said shaft with said shaft forming the longitudinal axis of said helix and said strip extending throughout substantially the entire portion of said shaft in the fractionating section of said column, both of said strips having a plurality of transverse wire strands extending beyond the outer longitudinal strands thereof and contacting the inner wall of said column at each end of said transverse strands whereby said shaft is maintained centered with respect to said column, a third wire gauze strip in the form of a helix carried by said shaft with said shaft forming the longitudinal axis of said helix and said strip extending along a substantial proportion of said shaft in said still pot, means mounted on the bottom of said still pot for maintaining the lower end of said shaft centered, and means for rotating said shaft operatively connected to said shaft at a point above said bead.

References Cited in the file of this patent

UNITED STATES PATENTS

| | | |
|---|---|---|
| 428,261 | Whitmore | May 20, 1890 |
| 2,539,699 | Perry | Jan. 30, 1951 |
| 2,608,528 | Piros | Aug. 26, 1952 |

FOREIGN PATENTS

| | | |
|---|---|---|
| 442,219 | Canada | June 17, 1947 |

OTHER REFERENCES

Journal of the Society of Chemical Industry No. 66, February 1947, pgs. 33–40.

Industrial and Engineering Chemistry, Analytical edition, vol. 12, 1940, pgs. 544–547.